United States Patent
Gallati et al.

(10) Patent No.: US 11,180,322 B2
(45) Date of Patent: Nov. 23, 2021

(54) CONVEYING DEVICE FOR THE CLOCK-INTEGRATION OF TRANSPORT UNITS

(71) Applicant: FERAG AG, Hinwil (CH)

(72) Inventors: Rudolf Gallati, Neuhaus (CH); Roberto Fenile, Wetzikon (CH)

(73) Assignee: FERAG AG, Hinwil (CH)

( * ) Notice: Subject to any disclaimer, the term of this patent is extended or adjusted under 35 U.S.C. 154(b) by 205 days.

(21) Appl. No.: 16/358,972

(22) Filed: Mar. 20, 2019

(65) Prior Publication Data

US 2019/0291968 A1    Sep. 26, 2019

(30) Foreign Application Priority Data

Mar. 20, 2018    (CH) .................................... 00369/18

(51) Int. Cl.
| | | |
|---|---|---|
| B65G 43/10 | (2006.01) | |
| B65G 19/02 | (2006.01) | |
| B65G 47/61 | (2006.01) | |
| B65G 43/08 | (2006.01) | |

(52) U.S. Cl.
CPC ........... *B65G 43/10* (2013.01); *B65G 19/025* (2013.01); *B65G 43/08* (2013.01); *B65G 47/61* (2013.01); *B65G 2201/0229* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,588,520 A | * | 12/1996 | Affaticati | B61B 13/08 198/370.06 |
| 5,860,504 A | * | 1/1999 | Lazzarotti | B65G 43/08 198/357 |
| 5,971,131 A | * | 10/1999 | Blattner | B65G 33/02 198/349.95 |
| 10,005,616 B2 | * | 6/2018 | Fenile | B65G 9/004 |
| 10,301,114 B2 | | 5/2019 | Fenile | |
| 10,336,548 B2 | | 7/2019 | Fenile et al. | |
| 10,399,779 B2 | * | 9/2019 | Fenile | B65G 9/002 |
| 10,934,102 B2 | * | 3/2021 | Sigrist | B65G 1/0457 |
| 2016/0221762 A1 | * | 8/2016 | Schroader | B65G 43/08 |
| 2016/0236897 A1 | * | 8/2016 | Gallati | B65H 37/04 |

(Continued)

FOREIGN PATENT DOCUMENTS

| | | |
|---|---|---|
| CH | 714 004 A1 | 1/2019 |
| DE | 10 2007 025 553 A1 | 12/2008 |
| EP | 0 700 844 A2 | 3/1996 |

(Continued)

*Primary Examiner* — Kyle O Logan
(74) *Attorney, Agent, or Firm* — Pauley Erickson & Swanson

(57) ABSTRACT

A conveying device (100) for the clock-integration of transport units (1, 1.1-1.4), includes a plurality of transport units, an indexing conveyor (2) for the clocked conveyance of the transport units, the indexing conveyor having a plurality of carriers (21, 21.1), which are respectively detachably connectable to a transport unit, at least one conveyor section (3), and a diverter (4), via which the conveyor section is connected at a clock-integration point (E) to the indexing conveyor and which is configured to clock-integrate the transport units at the clock-integration point into the indexing conveyor.

21 Claims, 6 Drawing Sheets

(56) References Cited

U.S. PATENT DOCUMENTS

2017/0282317 A1* 10/2017 Guhl ........................ B23Q 7/14

FOREIGN PATENT DOCUMENTS

| EP | 0 765 826 A1 | 4/1997 |
| EP | 1 224 038 A2 | 7/2002 |
| WO | WO 01/26827 A2 | 4/2001 |
| WO | WO 2016/030273 A1 | 3/2016 |
| WO | WO 2016/030275 A1 | 3/2016 |
| WO | WO 2016/108937 A1 | 7/2016 |

* cited by examiner

CONVEYING DEVICE FOR THE CLOCK-INTEGRATION OF TRANSPORT UNITS

CROSS-REFERENCE TO RELATED APPLICATIONS

Swiss Patent Applications 00369/18, filed 20 Mar. 2018, the priority documents corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention relates to a conveying device for the clock-integration of transport units and to a method for operating a conveying device.

Discussion of Related Art

In intralogistics, various devices for the conveyance of transport goods are employed, wherein the transport goods are typically conveyed with suitable transport units. According to requirement, the transport units can be conveyed at fixed distance apart from each other, for example when in certain conveyor sections a clocked conveyance is desirable, or at a variable distance apart from each other, for example in buffer sections. Within an intralogistic conveying system, various conveyor sections comprising different such types of conveyance can here be arranged and connected to one another.

In particular, in this context, the transfers from conveyor sections with transport units at variable distance apart from each other to conveyor sections with fixed distance between the transport units, for example in the clock-integration into an indexing conveyor, are technically challenging, since often an increased susceptibility to error and the likelihood of a reduced conveying capacity is given.

With the increasing complexity of intralogistic requirements, such transfers are becoming particularly numerous and relevant, for example in order picking systems in which different, in particular suspendingly transportable goods, are intended to be efficiently sorted with a high throughput and to be fully and correctly compiled.

Such an order picking system is described, for example, in Application CH00947/17 of the present Applicant, filed on 20 Jul. 2017, which comprises an infeed station having a plurality of parallel arranged infeed points for the delivery of the goods to be picked into the order picking system, and at least one dispatch station having a plurality of parallel arranged dispatch points for the delivery of the picked goods to the dispatch site, wherein, for the picking of the goods between the infeed station and the dispatch station, at least one intermediate store is provided. The at least one intermediate store comprises a dynamic store, for the intermediate storage of the goods provided for the order picking, and a downstream call-off store, for the storage of goods which have been withdrawn from the dynamic store and at the same time pre-sorted, which goods are arranged within a common circulating conveyor and are connected to one another via the common circulating conveyor.

SUMMARY OF THE INVENTION

The object of the invention is therefore to provide a conveying device for the clock-integration of transport units and a method for operating such a conveying device, which conveying device and method at least partially improve the prior art for the clock-integration of transport units.

This object is achieved by the features of the independent claims. Advantageous embodiments of the invention are given in the dependent claims and in the present description and the figures.

The invention relates to a conveying device for the clock-integration of transport units, comprising a plurality of transport units, an indexing conveyor for the clocked conveyance of the transport units, the indexing conveyor comprising a plurality of carriers, which are respectively detachably connectable to a transport unit, at least one conveyor section, and a diverter, via which the conveyor section is connected at a clock-integration point to the indexing conveyor and which is configured to clock-integrate the transport units at the clock-integration point into the indexing conveyor. At the conveyor section is arranged a first detection device, which is configured to respectively detect the extension of a transport unit. The conveying device has a control system, which is connected to the first detection device and to the diverter and is configured to divide the indexing conveyor along the direction of conveyance into logical segments having respectively at least one assigned extension region and to compare the respective detected extension of a transport unit at the clock-integration point with the at least one extension region of a logical segment at the clock-integration point, wherein the diverter is configured to clock-integrate a transport unit into the indexing conveyor when the detected extension of the transport unit at the clock-integration point lies in the at least one extension region of the logical segment at the clock-integration point.

Within the context of the subject invention, the term "clock" is based on the German noun "Takt", the term "clock-integrate" on the German verb "eintakten", the term "clock-integration" on the German noun "Eintaktung" or "Eintakten" and the term "clocked" is based on the German adjective "getaktet", and as used herein, they refer to synchronization.

In the indexing conveyor, the carriers are generally arranged at a fixed distance apart from each other, so that the transport units are conveyable at a fixed distance apart from each other. Within the context of the present invention, by clocked conveyance is therefore understood a conveyance of transport units at a specific distance apart from each other, wherein the indexing conveyor typically has a division for the fixed arrangement of the carriers. The carriers are here detachably connectable to the transport units in such a way that, between specific carriers which are in engagement with transport units, can be arranged free carriers without transport units.

In this context it will be clear to the person skilled in the art that jointly included with "fixed distance" are tolerances and displacements within the indexing conveyor, for example as a result of loads upon a chain. In contrast to transport units which can be conveyed independently from one another and at variable distance apart from each other, in an indexing conveyor the transport units should be regarded as being conveyable non-independently from one another and in a synchronized manner.

A high conveying capacity can here be provided, in that, in the course of the conveyance, a highest possible number of carriers is in engagement with transport units and the number of free carriers is minimized. Due to the fixed division of the indexing conveyor, for example by a chain, the minimum number of free carriers between successive carriers taken up with transport units is substantially defined by the extension of the transport units, for example by the depth in the direction of conveyance. In order to reduce the susceptibility to error in the clock-integration, in particular of transport units having different extensions, and, inter alia, to take account of a diverter switching time, the diverter can, for example, clock-integrate the transport units from the conveyor section into the indexing conveyor such that, irrespective of the extension of the transport units, a sufficiently high minimum number of carriers between respectively successive occupied carriers is kept free, which usually, however, has an negative effect on the conveying capacity.

The invention offers the advantage that the susceptibility to error in the clock-integration is kept low and, at the same time, the number of free carriers can be minimized, so that the conveying capacity is optimized. By the first detection device, the respective extension of the transport units at the clock-integration point can be detected and transmitted to the control system. With the division of the indexing conveyor into logical segments having respectively at least one assigned extension region, the occupation of the carriers with transport units along the indexing conveyor can be adapted to the variability of the extensions of the transport units. Through the assignment of an extension region, a specific range of extension values can be defined, for which transport units can be clock-integrated into a specific logical segment. This allows tolerances in the detected extensions of the transport units to be accommodated. In addition, it is also possible to clock-integrate transport units having different extensions, which can be conveyed in the same logical segment, for example since the extensions do not overly differ, into one specific logical segment.

The division of the indexing conveyor into logical segments is preferably performed by the control system and can be changed by the control system. In particular, the length of the logical segments, or the number of carriers in a logical segment or which specific carriers are contained in the respective logical segment, can be adapted by the control system.

The extension of a transport unit can in some embodiments comprise a depth of the transport unit in the direction of conveyance and/or a width of the transport unit transversely to the direction of conveyance, or other geometric dimensions. The detection device, the control system and the diverter can correspondingly be configured to operate in dependence on the depths and/or widths or other geometric dimensions of the transport units.

Preferably, the control system is configured to respectively assign to the at least one extension region a carrier value of a number of carriers between two successive transport units in the respective logical segment, and the diverter is configured to clock-integrate transport units respectively in such a way into the indexing conveyor that the number of carriers between two successive transport units in the logical segment corresponds to the assigned carrier value of the extension region.

The carrier value therefore constitutes the number of free carriers between carriers which are taken up or are to be taken up with transport units. This carrier value can be transmitted from the control system of the diverter, so that the diverter clock-integrates the transport units in such a way into a respective logical segment of the indexing conveyor that the number of free carriers between carriers which are occupied or are to be occupied corresponds to the transmitted carrier value according to the extension region. For example, transport units having extensions which call for five free carriers between occupied carriers can be clock-integrated into logical segments of the indexing conveyor having an extension region to which a carrier value with five free carriers is assigned.

In addition, through a suitable choice of extension region, mixed logical segments having differently expanded transport units but, due to a specific carrier value, having equal distances between successive transport units can be provided.

For transport units having comparatively large extensions, a logical segment having an extension region which encompasses large extension values can therefore be provided. In this kind of logical segment of the indexing conveyor, transport units having comparatively large extensions can be clock-integrated by the diverter, wherein the carriers are advantageously taken up with transport units such that a sufficient number of free carriers lies there between and there is sufficient space available between successive transport units.

By contrast, in the case of comparatively small extensions of the transport units, a logical segment having an extension region which encompasses small extension values can be provided. In this kind of logical segment, the diverter can clock-integrate the transport units in shorter clocks, i.e. with a smaller number of free carriers between carriers which are occupied or are to be occupied.

In particular, surplus free carriers which are not required to ensure a sufficient distance between the transport units can thus be reduced or avoided, so that, with adapted distances between the transport units, an optimized utilization of the indexing conveyor can be provided.

The first detection device can in some embodiments be an optical sensor, for example comprising a light barrier, or an inductive sensor. In specific embodiments, the first detection device can be configured as a read-out device, which reads the extension information on the transport unit, for example via a barcode or RFID tag arranged at the transport unit, or from a data bank, in which the extension information of transport units on the conveyor section is filed.

In an advantageous embodiment, the conveying device has a plurality of conveyor sections, which are connected at various clock-integration points to the indexing conveyor. By virtue of the control system and the division of the indexing conveyor into logical segments, it can be achieved that the clock-integration of transport units from the plurality of conveyor sections is distributed in an optimized manner over the indexing conveyor, according to the respective extensions of the transport units.

In one embodiment, the diverter is configured to detain a transport unit in the conveyor section when the detected extension of the transport unit at the clock-integration point lies outside the at least one extension region of the logical segment at the clock-integration point.

In this way, transport units having an unsuitable extension can be prevented from being clock-integrated into a logical segment of the indexing conveyor. For example, a transport unit having an extension for which, between two transport units, five free carriers are necessary can be prevented from being clock-integrated into a logical segment having an extension region with extension values for which, between transport units, three free carriers are provided. The susceptibility to error in the clock-integration can thereby be reduced.

Alternatively or additionally, a transport unit having an extension for which, between two transport units, two free carriers suffice can be prevented, for example, from being clock-integrated into a logical segment having an extension region with extension values for which, between transport units, five free carriers are provided. The conveying capacity can thereby be optimized, since the number of unnecessary free carriers can be reduced.

In one embodiment, the transport units are conveyable on the conveyor section at variable distance apart from each other.

In particular for the clock-integration of transport units from such conveyor sections into an indexing conveyor, the invention is advantageous, since on the conveyor section non-synchronized transport units can be optimally distributed over the indexing conveyor according to their extension.

In one embodiment, the conveyor section has near the clock-integration point a curvature.

Curvatures of the conveyor section near a clock-integration point can feature, in particular, in conveying devices in which the conveyor section is arranged perpendicular to the direction of conveyance of a portion of the indexing conveyor to which the conveyor section is connected. A curvature of the conveyor section near a clock-integration point can lead to a situation in which the necessary distance between successive transport units in the indexing conveyor is increased. Preferably, the curvature of the conveyor section near the clock-integration point is taken into account by the control system by way of an adapted extension region and/or an adapted carrier value.

For example, the control system can take account of the effect of a curvature, in particular for transport units having a specific minimum extension or more, for example with a minimum depth along the direction of conveyance amounting to double the width of the transport units transversely to the direction of conveyance, by reducing the extension values of an extension region. Alternatively or additionally, the control system can increase the carrier value of an extension region in order to take account of the effect of a curvature.

In one embodiment, the indexing conveyor is configured as a circulating conveyor.

In one embodiment, the indexing conveyor is configured as an endless conveyor.

The circulating conveyor is a conveyor with which the transport units can be conveyed in a closed circulation or circuit. At various points at the circulating conveyor, actuable or switchable diverters, which enable a targeted entry of transport units into the circuit or an exit of transport units circulating in the circuit, can here be provided. In particular, to the circulating conveyor, for example within the circulating conveyor, conveyor sections can be connected via diverters.

In one embodiment, the indexing conveyor has an initiator, which is configured to assign a first carrier, preferably cyclically, to a first logical segment.

By virtue of the initiator, with the first carrier a zero point can be located such that the control system can identify and track the position of all carriers in the indexing conveyor. Correspondingly, the control system can assign the identified carriers to the logical segments. At the indexing conveyor can be arranged, in particular, a rotary encoder for the identification of the carriers. Furthermore, the initiator offers the advantage that the identification of the carriers can be checked in a circulating conveyor, preferably cyclically. In the event of deviations from the original identification, for example due to displacements within or between logical segments, the initiator can perform a new assignment of a first carrier to a logical segment for the purpose of a calibration. Such displacements can be provoked, for example, by chain tensions, holding operations, reverse runs, etc.

In one embodiment, the transport units respectively have a receiving unit, wherein the extension of the transport units is defined by the extension of the receiving units, preferably in the direction of conveyance.

The receiving units can be bags, containers, baskets, cartons, transport carriers or the like.

In a preferred embodiment, the receiving units are configured as bags, wherein, for example, the depth of the bags in the direction of conveyance can be defined by the received transport article. For example, the bags can be of collapsible configuration, so that the bags, in an empty configuration, can have a small depth. Through the reception of a large transport article, the bag can be unfolded, so that the depth is increased. The first detection device can detect the depth of the filled bags at the clock-integration point and transmit this to the control system or the diverter.

In one embodiment, the transport units respectively have a carriage, to which the receiving units can respectively be fastened, wherein the carriages can be brought into engagement with the carriers of the indexing conveyor, preferably via a pin.

The conveyor section can comprise a running rail, in which the carriages are conveyable independently and at a variable distance apart from each other.

The transport units can in some embodiments have trolleys, which are respectively attached to one or two carriages.

To the trolleys can be attached bags, frameworks, clamps, grilles, trays, baskets, etc.

In one embodiment, the control system is configured to assign to the logical segments half-open extension regions, which are delimited by a maximal extension or by a minimal extension.

In one embodiment, at the conveyor section is arranged an infeed station, which is configured to load the transport units with transport goods.

In a variant, in the loading of a transport unit with a transport article, an extension is assigned and transmitted to the first detection device by the infeed station. The extension can be defined by an information carrier, such as, for example, a barcode or a RFID tag, or information about the transport goods which is filed in the infeed station.

Preferably, the first detection device is arranged after the infeed station and configured to detect the extension of the loaded transport units.

On a conveyor section can also be arranged a plurality of infeed stations, which respectively load the transport units with transport goods. Preferably, the first detection device is in such a case arranged after the last infeed station in order to detect the extension of a transport unit after the last loading.

In one embodiment, after the clock-integration point is arranged at the indexing conveyor a sensor, which is connected to the control system and configured to detect the number and/or position of transport units in a logical segment.

By the sensor, it can be determined whether a specific division of the indexing conveyor into logical segments, or the location or assignment of the extension regions, or the assignment of the carrier values, is optimal. If the sensor establishes, for example, that a logical segment is conveying little or no transport units away from the clock-integration point, this can be an indication that, for example, the specific division into logical segments, or the location or assignment of the extension regions, or the assignment of the carrier values, is not optimal.

Preferably, the sensor is configured to transmit the number and/or position of the transport units in a logical segment to the control system, and the control system is configured to change the division of the indexing conveyor into logical segments, or the extension regions respectively assigned to the logical segments, in dependence on that number and/or position of transport units which is detected by the sensor.

Furthermore, the control system can adapt the carrier values or the assignment of the carrier values in order to achieve a better utilization of the logical segments.

In one embodiment, the indexing conveyor has a chain having chain links on which the carriers are arranged.

In particular, the transport goods can be transported in the indexing conveyor, hanging from individual carriages, along a running rail, wherein the carriages are moved in the indexing conveyor by a driven conveyor chain which is guided parallel to the running rail in a dedicated rail and is in releasable engagement with the carriages. Suitable carriages and running rails are described and disclosed, for instance, in WO2016/030275 A1. It is also conceivable, however, to arrange a conveyor chain laterally, as is shown in WO2016/030273 A1.

In one embodiment, at the conveyor section before the diverter is arranged a second detection device, which is connected to the control system and is configured to detect the extension of the transport units before the diverter and to compare this with the extension detected by the first detection device.

With the second detection device, the extension detected by the first detection device can be checked. This can be advantageous when a transport article moves along the conveyor section in the transport unit and in this way changes the extension of the transport unit. In respect of a bag, this can be the case, for example, if a transport article tilts or pivots in the bag. A checking of the extension can also be advantageous if the transport unit itself, for example by rotation, turns or inadvertently empties along the conveyor section.

In one embodiment, the first detection device is configured to detect the depth of a transport unit along the direction of conveyance and/or the width of a transport unit transversely to the direction of conveyance, and the control system is configured to assign to the logical segments extension regions for the depths and/or widths.

In one embodiment, the control system is configured to assign to at least one logical segment at least two disjunctive extension regions.

Through the assignment of disjunctive extension regions, in particular mixed logical segments having different distances between successive transport units can be provided. In addition, to the disjunctive extension regions can be assigned different carrier values. Optionally, to the disjunctive extension regions are assigned additional intermediate carrier values, wherein the diverter is configured, in the case of successive transport units having different extensions, to clock-integrate the transport units such that, between the successive transport units having different extensions, the number of intervening free carriers corresponds to an intermediate carrier value.

In one embodiment, the control system is configured to provide at least one disjunctive extension region for the depths of the transport units along the direction of conveyance, and at least one disjunctive extension region for the widths of the transport units transversely to the direction of conveyance, wherein the control system is preferably configured to assign to the extension regions an identifier for the marking of the respective extension region for depths or widths. Preferably, the diverter is configured to read the identifier and to compare the appropriate extension region with the depth or the width.

The invention further relates to a method for operating a conveying device according to the present invention, comprising the steps: i) provision of transport units in a conveyor section; ii) division of the indexing conveyor into logical segments by the control system; iii) assignment of at least one extension region to respectively a logical segment by the control system; iv) detection of the extension of the transport units along the direction of conveyance by the first detection device; v) transmission of the detected extension to the control system or the diverter; vi) comparison of the detected extension of a transport unit at the clock-integration point with the at least one extension region of a logical segment at the clock-integration point; vii) clock-integration of the transport unit from the conveyor section into the indexing conveyor by the diverter when the detected extension lies in the at least one extension region of the logical segment.

To the person skilled in the art, it is clear that the steps of the method do not necessarily have to be carried out consecutively in the order described.

In one embodiment, the control system respectively assigns to the at least one extension region a carrier value of a number of carriers between two successive transport units in the respective logical segment, and the diverter clock-integrates the transport units respectively in such a way into the indexing conveyor that the number of carriers between two successive transport units in the logical segment corresponds to the assigned carrier value of the extension region.

BRIEF DESCRIPTION OF SEVERAL VIEWS OF THE DRAWINGS

Embodiments of the invention are explained in greater detail with reference to the following figures and the associated description, wherein.

DESCRIPTION OF PREFERRED EMBODIMENTS

In order to illustrate the invention, preferred embodiments are described in greater detail with reference to the figures.

Figure 1:
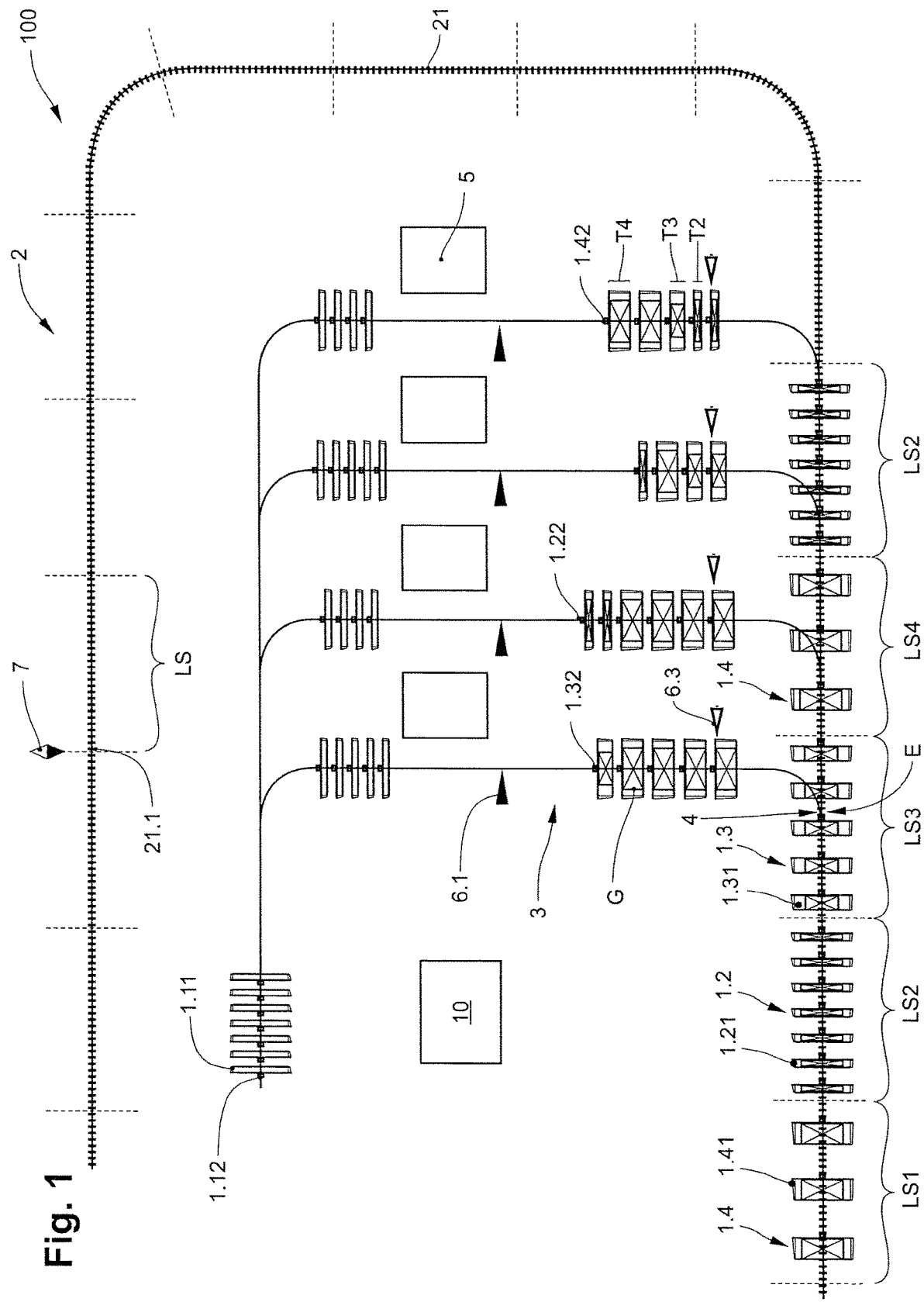
FIG. 1 shows a schematic representation of one embodiment of a conveying device.

FIG. 1 shows a schematic representation of one embodiment of a conveying device 100 comprising a plurality of transport units 1.1, 1.2, 1.3, 1.4, an indexing conveyor 2 for the clocked conveyance of the transport units 1.1-1.4 with a plurality of carriers 21, which are respectively detachably connectable to a transport unit. The transport units 1.1-1.4 comprise bags 1.11-1.41, which are fastened to carriages 1.12-1.42 and which can receive a transport goods item G. The transport goods G have different extensions, which, following the loading of the bags 1.11, lead to different extensions T2, T3, T4 of the transport units 1.1-1.4. In the present embodiment, the extensions T2, T3, T4 constitute the depths of the transport units in the direction of conveyance. The conveying device 100 further comprises four conveyor sections 3 and four diverters 4, via which the conveyor sections 3 respectively, at a clock-integration point E, are connected to the indexing conveyor 2. The conveyor sections 3 are arranged perpendicular to the direction of conveyance of that portion of the indexing conveyor 2 to which the conveyor sections 3 are connected and have at the clock-integration points E a curvature.

The transport units 1.1-1.4 are conveyable in the conveyor sections 3 independently and at a variable distance apart from each other. At the conveyor sections 3 is respectively arranged an infeed station 5, which load the empty bags 1.11 of the transport units 1.1 with the transport goods G. After the infeed stations 5, there is respectively arranged at the conveyor sections 3 a first detection device 6.1, which detects the extensions T2-T4 of the transport units 1.2-1.4. Further downstream, there is arranged at the conveyor sections 3 respectively before the clock-integration points E a second detection device 6.3, which checks the extensions T2-T4 of the transport units 1.2-1.4.

The indexing conveyor 2 is divided by a control system 10 into logical segments LS, LS1, LS2, LS3, LS4 etc., which are symbolized by dashed lines. To the logical segments LS1 and LS4 are assigned extension ranges into which the extensions T4 of the thickest transport units 1.4 fall. To the logical segment LS2 is assigned an extension range into which the extensions T2 of the thinnest transport units 1.2 fall. To the logical segment LS3 is arranged an extension range into which the extensions T3 of medium-thick transport units 1.3 fall. The diverter 4 clock-integrates the transport units 1.2-1.4 in such a way into the indexing conveyor 2 that the logical segments LS1-LS4 respectively convey transport units 1.2-1.4 having different extensions T2-T4, which correspond to the respective ranges of extension of the logical segments LS1-LS4.

As can further be seen in FIG. 1, to the ranges of extension there is respectively assigned a carrier value, so that the number of free carriers between successive occupied carriers is defined for the respective logical segments LS1-LS4 and is different according to the extension T2-T4 of the conveyed transport units 1.2-1.4. The number of free carriers is optimized to the extension T2-T4 of the transport units and increases with rising extension T2-T4 of the transport units 1.2-1.4. From FIG. 1 it can be seen that the logical segments LS1-LS4 respectively convey transport units having a defined extension, although the transport units 1.2-1.4 are fed mixed onto conveyor sections 3. The carrier values of the logical segments LS1-LS4 are defined such that the distance between successive transport units 1.2-1.4 is adapted to the curve in the curvature of the conveyor sections 3 at the clock-integration points E, as is stated more exactly further below with reference to FIG. 3. At the indexing conveyor 2 is further arranged an initiator 7, which assigns a first carrier 21.1 to a first logical segment LS.

Figure 2:
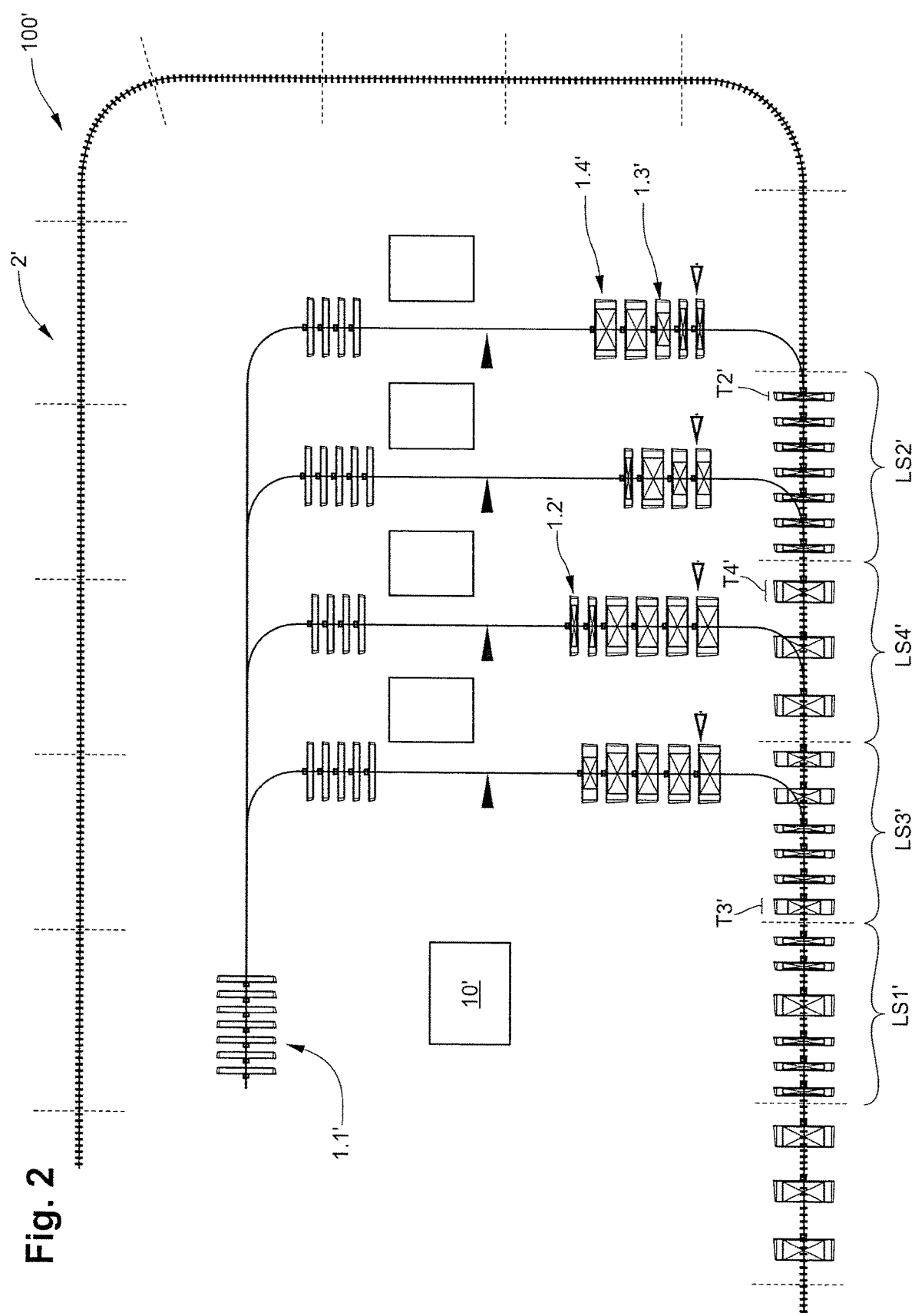
FIG. 2 shows a schematic representation of a further embodiment of a conveying device.

FIG. 2 shows a further embodiment of a conveying device 100' having transport units 1.1', 1.2', 1.3', 1.4'. The indexing conveyor 2' is divided by the control system 10' into logical segments LS1', LS2', LS3', LS4'. Conveyor sections, receiving stations, first and second detection devices are configured analogously to the embodiment according to FIG. 1. To the logical segment LS2' is assigned an extension region, into which the extensions T2' of the thinnest transport units 1.2' fall. To the logical segment LS4' is assigned an extension region, into which the extensions T4' of the thickest transport units 1.4' fall. Unlike the embodiment shown in FIG. 1, to the logical segments LS1', LS3' are respectively assigned at least two disjunctive extension regions, so that mixed logical segments LS1', LS3' having differently thick transport units 1.2'-1.4' and different spacings or a different number of free carriers between the transport units 1.2'-1.4' are formed. To the logical segment LS1' is assigned a first extension region, into which the extensions T2' of the thinnest transport units 1.2' fall. Furthermore, to the logical segment LS1' is assigned a disjunctive second extension region, into which the extensions T4' of the thickest transport units 1.4' fall. The extensions T3' of the medium-thick transport units 1.3' fall into a disjunctive third extension region, which is assigned to the logical segment LS1'.

To the first and the second extension region of the logical segment LS1' are respectively assigned first and second carrier values, which define the number of free carriers between carriers occupied by thin transport units 1.2'n and between carriers occupied by thick transport units 1.4'. In addition, to the first and second extension regions are assigned additional intermediate carrier values, which define the number of free carriers between a carrier occupied by a thin transport unit 1.2' and a carrier occupied by a thick transport unit 1.4'. To the third extension regions are correspondingly assigned third carrier values and additional intermediate carrier values.

Analogously, to the logical segment LS3' are assigned two disjunctive extension regions for the extensions T2' of the thinnest transport units 1.2' and for the extensions T3' of medium-thick transport units 1.3'. The extensions T4' of the thickest transport units 1.4' can fall, for the logical segment LS3', into a disjunctive third extension region. According to the occurring extensions of the transport units, further disjunctive extension regions can be assigned to the logical segments.

Figure 3:
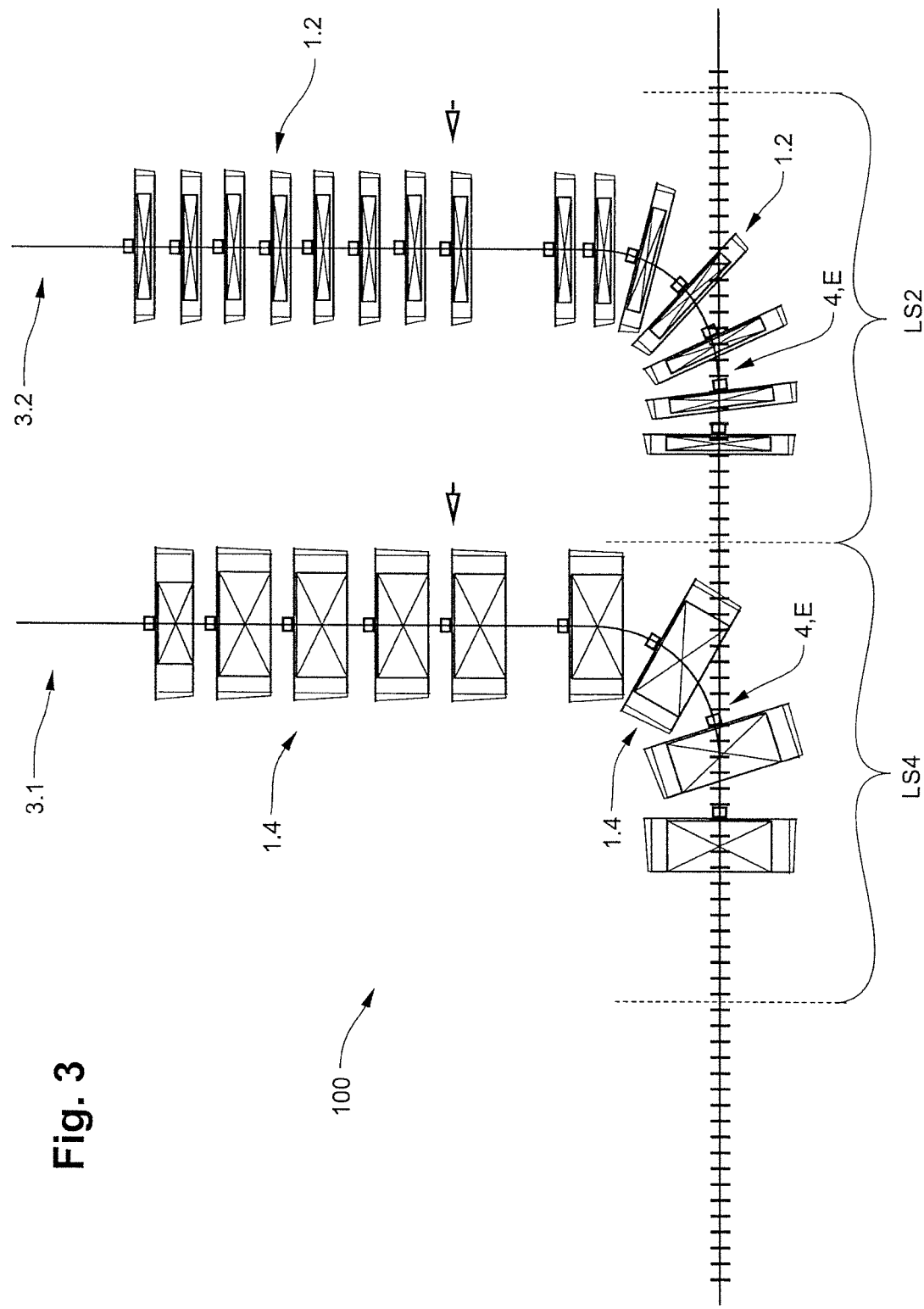
FIG. 3 shows an enlarged representation of the conveying device from FIG. 1 in the region of two clock-integration points.

FIG. 3 shows an enlarged representation of the conveying device 100 from FIG. 1 in the region of two clock-integration points E. For a better overview, on the conveyor section 3.1, apart from the rearmost transport unit, only thick transport units 1.4 and, on the conveyor section 3.2, only thin transport units 1.2 are shown. As can be seen in FIG. 3, due to the curves in the curvatures of the conveyor sections 3.1, 3.2 near the clock-integration points E, a greater distance is necessary between the thick transport units 1.4 than between the thin transport units 1.2. Accordingly, the carrier values of the logical segments LS4, LS2 are adapted in order to accommodate the distances which are necessary due to the curvatures.

Figure 4B:
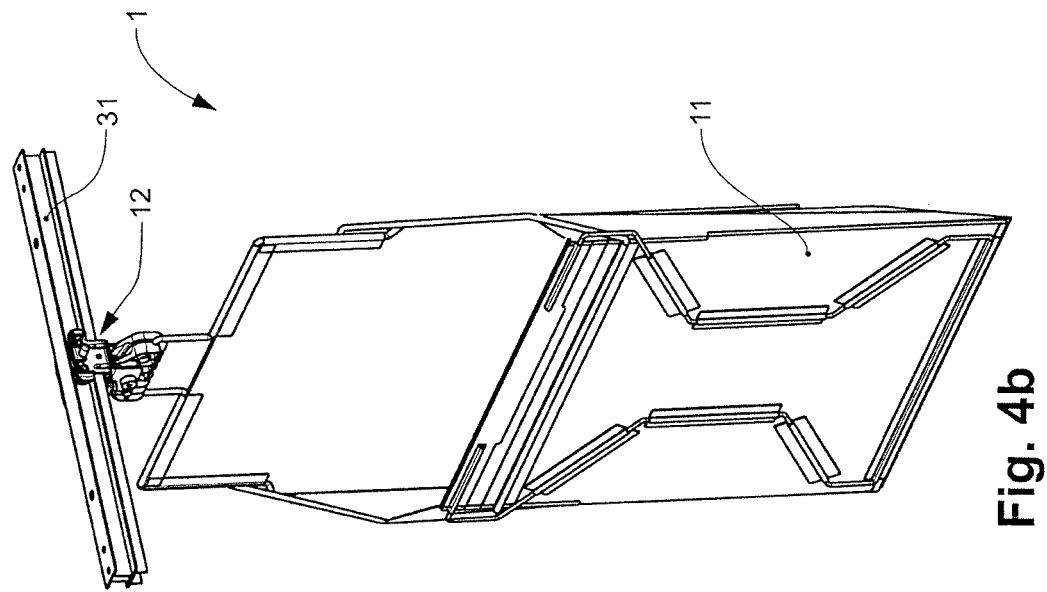
FIG. 4b shows a perspective view of the embodiment of the transport unit shown in FIG. 4a, having a collapsed bag.
Figure 4A:
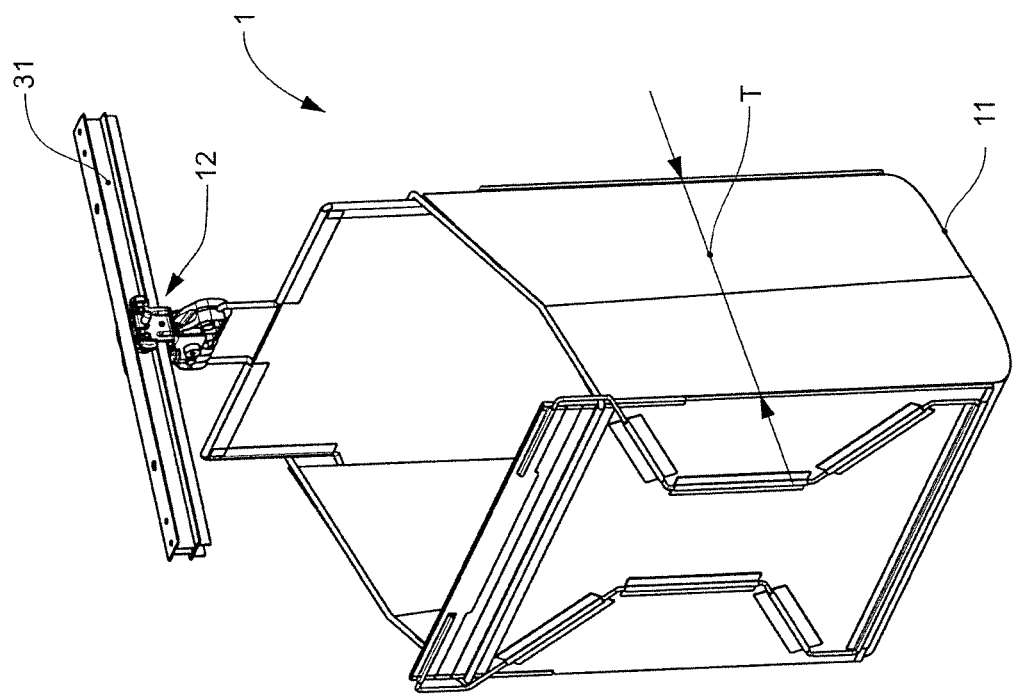
FIG. 4a shows a perspective view of one embodiment of a transport unit, which is conveyable hanging from a running rail, having a bag following loading.

FIGS. 4a and 4b show perspective views of an embodiment of a transport unit 1 which is conveyable hanging from a running rail 31. The transport unit 1 comprises a bag 11, which is fastenable to a carriage 12. The carriage 12 is conveyable independently from other carriages, at variable distance from these, in the running rail 31. FIG. 4b shows a collapsed bag 11 prior to the loading with a transport article. FIG. 4a shows the bag 11 following the loading with a transport article, so that the extension of the bag 11 in the direction of conveyance defines the depth T of the transport unit 1.

Figure 5:
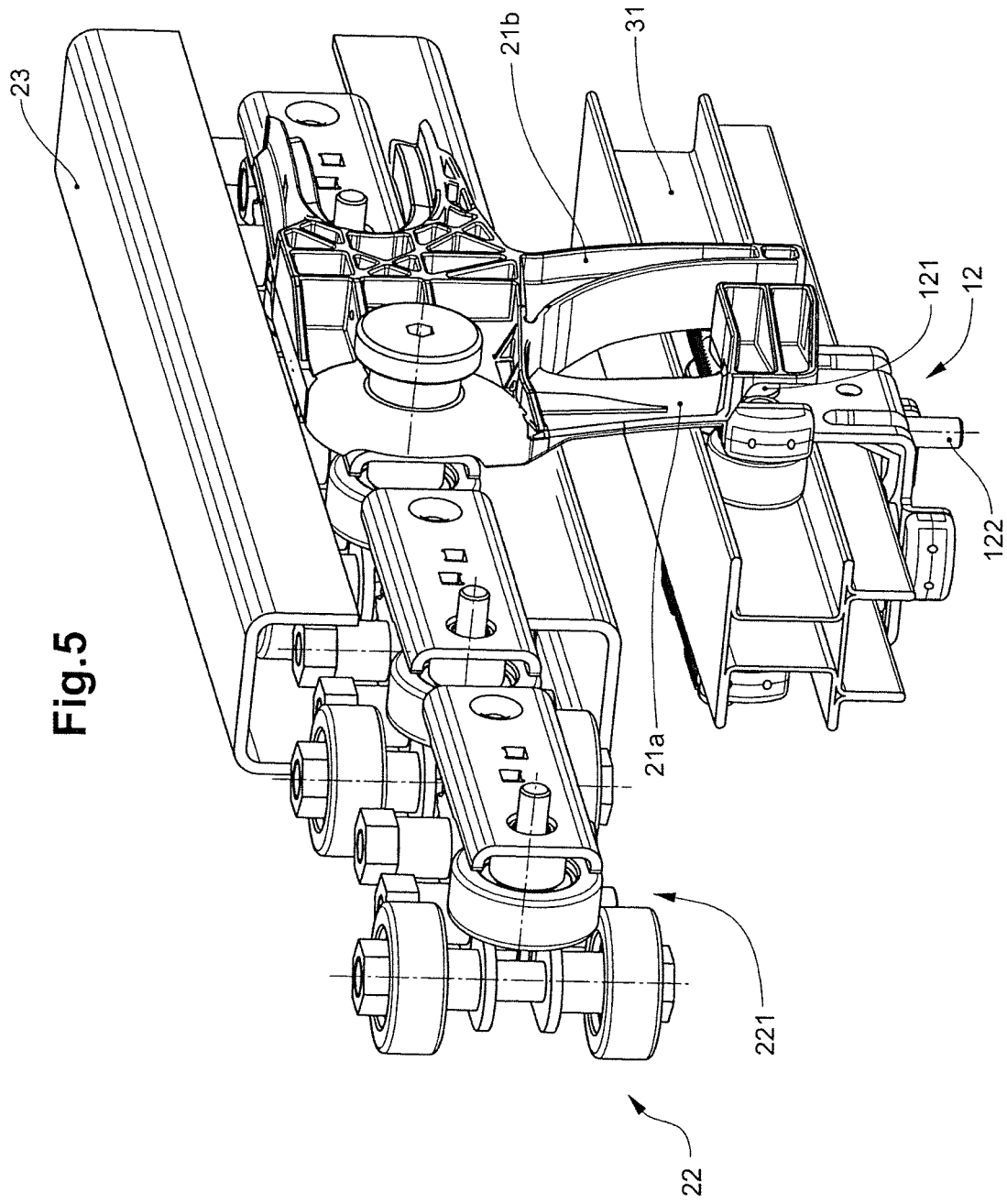
FIG. 5 shows a perspective view of a detail of one embodiment of an indexing conveyor.

FIG. 5 shows a perspective view of a detail of an embodiment of an indexing conveyor 2. The indexing conveyor 2 comprises a conveyor chain 22, which is guided with its chain links 221 in a rail 23. Held in parallel beneath the rail 23 of the conveyor chain 22 is a running rail 31, in which individual carriages 12 are movably mounted. The chain links 221 of the conveyor chain 22 are engaged with the carriages 12 via downwardly protruding carriers 21a, 21b and a pin 121 on the carriage 12, so that a conveying movement of the conveyor chain 22 produces a corresponding movement of the engaged carriages 12. On each of the carriages 12 is provided a connecting element 122, by means of which a receiving unit, such as, for example, a bag, can be suspended from the carriage 12.

Figure 6:
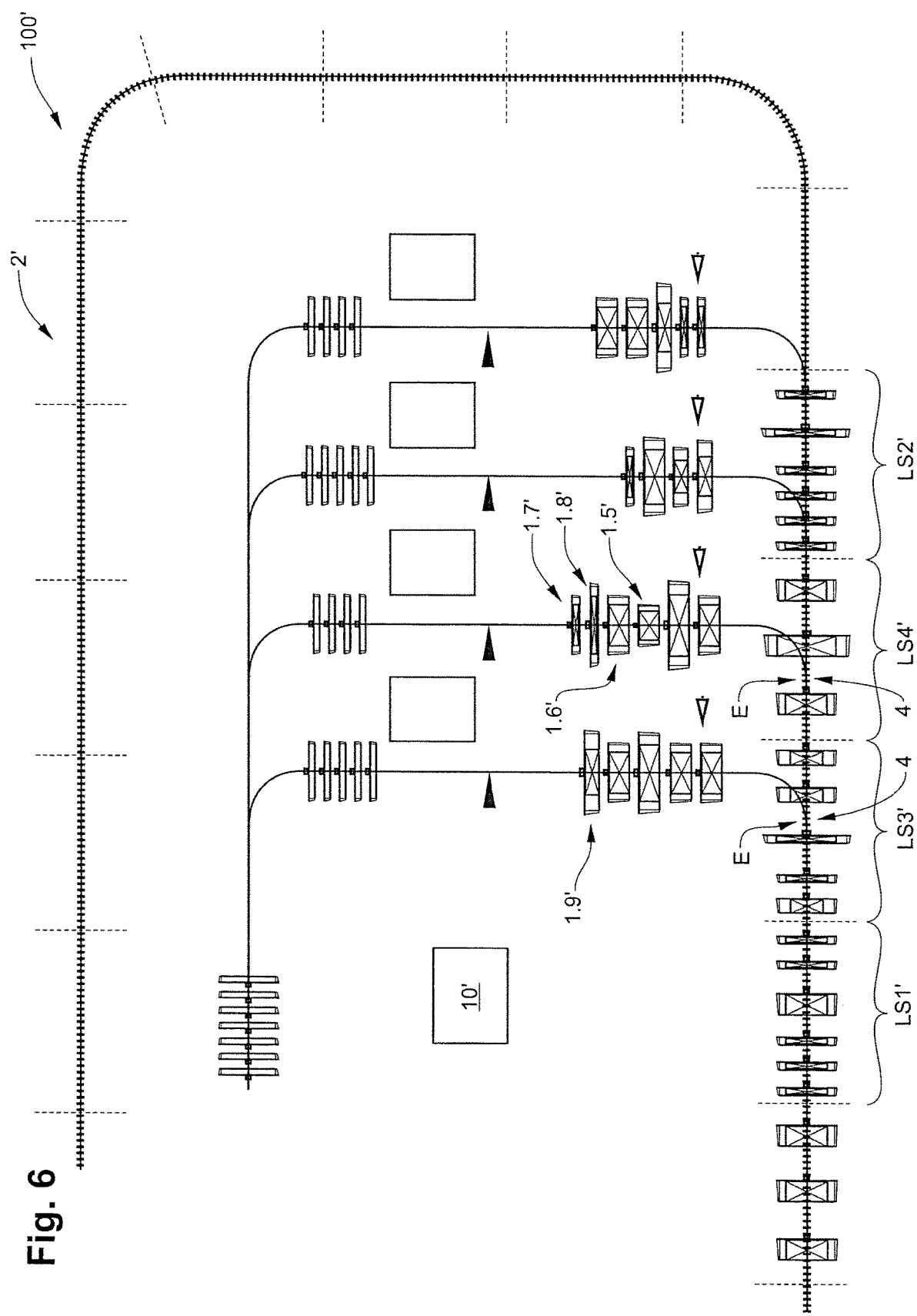
FIG. 6 shows a schematic representation of the conveying device from FIG. 2 with transport units having different depths and different widths.

FIG. 6 shows a schematic representation of the conveying device from FIG. 2, wherein in the conveying device are conveyed transport units 1.5'-1.9', wherein the different extensions of the transport units 1.5'-1.9' embrace both the depths of the transport units 1.5'-1.9' in the direction of conveyance and the widths of the transport units 1.5'-1.9' transversely to the direction of conveyance. In the figure, a narrowest transport unit 1.5' and widest transport units 1.8', 1.9', as well as transport units 1.6', 1.7' having medium widths transversely to the direction of conveyance, are denoted. Though the widest transport units 1.8', 1.9' have an equal width transversely to the direction of conveyance, they have different depths along the direction of conveyance. A similar relationship is obtained with the medium-wide transport units 1.6', 1.7', which, though they have an equal width transversely to the direction of conveyance, have different depths along the direction of conveyance. To the logical segments are assigned, additionally to the extension regions into which the depths of the transport units fall and which have already been described with reference to FIG. 2, disjunctive extension regions for the widths of the transport units. In this way, mixed logical segments, in which transport units having both different depths and different widths are conveyable, can be provided. The division into the logical segments is performed in such a way that an optimized clock-integration into the indexing conveyor, which takes into account both the depths and widths of the transport units and the curvatures of the conveyor sections at the clock-integration points E, is provided.

In FIG. 6 are shown mixed logical segments, as examples of the logical segments LS2'-LS4'. To the logical segment LS2' is assigned, for the depth of the transport units, an extension region in which the depths of the thinnest transport units fall. In addition, to the logical segment LS2' are assigned, for the widths of the transport units, at least two disjunctive extension regions in which, as shown in the figure, the width of the medium-wide and widest transport units, for example, fall. To the logical segment LS4' is assigned, for the depth of the transport units, an extension region in which the depths of the thickest transport units fall, as well as additionally, for the widths of the transport units, at least two disjunctive extension regions. To the logical segment LS3' are assigned at least two disjunctive extension regions both for the depths of the transport units and for the widths of the transport units, so that a logical segment LS3', which is mixed both in terms of the depths and in terms of the widths, is formed. To the extension regions for the depths and for the widths is assigned in the control system 10' an identifier, which respectively marks whether an extension region relates to a depth or width of a transport unit. The diverters 4 are configured to read the identifier and to compare the appropriate extension region with the depth or width.

We claim:

1. A conveying device (100, 100') for the clock-integration of transport units (1, 1.1-1.4, 1.1'-1.9'), comprising:
    a plurality of transport units;
    an indexing conveyor (2, 2') for clocked conveyance of the transport units, the indexing conveyor comprising a plurality of carriers (21, 21.1, 21a-b), which are respectively detachably connectable to a transport unit;
    at least one conveyor section (3, 3.1, 3.2); and
    a diverter (4), via which the conveyor section is connected at a clock-integration point (E) to the indexing conveyor and which is configured to clock-integrate the transport units at the clock-integration point into the indexing conveyor;
    a first detection device (6.1) arranged at the conveyor section (3, 3.1, 3.2), the first detection device (6.1) configured to respectively detect the extension (T, T2-T4, T2'-T4') of a transport unit (1, 1.1-1.4, 1.1'-1.9'); and
    a control system (10, 10'), connected to the first detection device and to the diverter (4) and configured to divide the indexing conveyor (2, 2') along the direction of conveyance into logical segments (LS, LS1-LS4, LS1'-LS4') having respectively at least one assigned extension region and compare the respective detected extension of a transport unit at the clock-integration point (E) with the at least one extension region of a logical segment at the clock-integration point, wherein the diverter is configured to clock-integrate a transport unit into the indexing conveyor when the detected extension of the transport unit at the clock-integration point lies in the at least one extension region of the logical segment at the clock-integration point.

2. The conveying device (100, 100') according to claim 1, wherein the control system (10, 10') is configured to respectively assign to the at least one extension region a carrier value of a number of carriers (21, 21.1, 21a-b) between two successive transport units (1, 1.1-1.4, 1.1'-1.9') in the respective logical segment (LS, LS1-LS4, LS'-LS4'), and the diverter (4) is configured to clock-integrate transport units (1, 1.1-1.4, 1.1'-1.9') respectively in such a way into the indexing conveyor (2, 2') that the number of carriers (21, 21.1, 21a-b) between two successive transport units (1, 1.1-1.4, 1.1'-1.9') in the logical segment (LS, LS1-LS4, LS1'-LS4') corresponds to the assigned carrier value of the extension region.

3. The conveying device (100, 100') according to claim 1, wherein the diverter (4) is configured to detain a transport unit (1, 1.1-1.4, 1.1'-1.9') in the conveyor section (3, 3.1, 3.2) when the detected extension (T, T2-T4, T2'-T4') of the transport unit (1, 1.1-1.4, 1.1'-1.9') at the clock-integration point (E) lies outside the at least one extension region of the logical segment (LS, LS1-LS4, LS1'-LS4') at the clock-integration point (E).

4. The conveying device (100, 100') according to claim 1, wherein the transport units (1, 1.1-1.4, 1.1'-1.9') are conveyable on the conveyor section (3, 3.1, 3.2) at a variable distance apart from each other.

5. The conveying device (100, 100') according to claim 1, wherein the conveyor section (3, 3.1, 3.2) at the clock-integration point (E) has a curvature.

6. The conveying device (100, 100') according to claim 1, wherein the indexing conveyor (2, 2') is configured as a circulating conveyor.

7. The conveying device (100) according to claim 6, wherein the indexing conveyor (2) has an initiator (7), which is configured to assign a first carrier (21.1), preferably cyclically, to a first logical segment (LS).

8. The conveying device (100, 100') according to claim 1, wherein the transport units (1, 1.1-1.4, 1.1'-1.9') respectively have a receiving unit (11, 1.11-1.41), wherein the extension (T, T2-T4, T2'-T4') of the transport units is defined by the extension of the receiving units (11, 1.11-1.41), preferably in the direction of conveyance.

9. The conveying device (100, 100') according to claim 8, wherein the transport units (1, 1.1-1.4, 1.1'-1.9') respectively have a carriage (12, 1.12-1.42) to which the receiving units (11, 1.11-1.41) can respectively be fastened, wherein the carriages (12, 1.12-1.42) can be brought into engagement with the carriers (21, 21.1, 21a-b) of the indexing conveyor (2, 2'), preferably via a pin (121).

10. The conveying device (100, 100') according to claim 1, wherein the control system (10, 10') is configured to assign to the logical segments (LS, LS1-LS4, LS1'-LS4') half-open extension regions, which are delimited by a maximal extension or by a minimal extension.

11. The conveying device (100, 100') according to claim 1, wherein the conveyor section (3, 3.1, 3.2) is arranged an infeed station (5), which is configured to load the transport units (1, 1.1-1.4, 1.1'-1.9') with transport goods (G).

12. The conveying device (100, 100') according to claim 11, wherein the first detection device (6.1) is arranged after the infeed station (5) and configured to detect the extension (T, T2-T4, T2'-T4') of the loaded transport units (1, 1.2-1.4, 1.2'-1.4').

13. The conveying device (100, 100') according to claim 1, wherein after the clock-integration point (E) is arranged at the indexing conveyor (2, 2') a sensor, which is connected to the control system (10, 10') and configured to detect the number and/or position of transport units (1, 1.1-1.4, 1.1'-1.9') in a logical segment (LS, LS1-LS4, LS1'-LS4').

14. The conveying device (100, 100') according to claim 13, wherein the sensor is configured to transmit the number and/or position of the transport units (1, 1.1-1.4, 1.1'-1.9') in a logical segment (LS, LS1-LS4, LS1'-LS4') to the control system (10, 10'), and the control system (10, 10') is configured to change the division of the indexing conveyor (2, 2') into logical segments (LS, LS1-LS4, LS1'-LS4'), or the extension regions respectively assigned to the logical segments (LS, LS1-LS4, LS1'-LS4'), in dependence on that number and/or position of the transport units (1, 1.1-1.4, 1.1'-1.9') which is detected by the sensor.

15. The conveying device (100, 100') according to claim 1, wherein the indexing conveyor (2, 2') includes a chain (22) having chain links (221) on which the carriers (21, 21.1, 21a-b) are arranged.

16. The conveying device (100, 100') according to claim 1, wherein at the conveyor section (3, 3.1, 3.2) before the diverter (4) is arranged a second detection device (6.3), which is connected to the control system (10, 10') and is configured to detect the extension (T, T2-T4, T2'-T4') of the transport units (1, 1.1-1.4, 1.1'-1.9') before the diverter (4) and to compare this with the extension (T, T2-T4, T2'-T4') detected by the first detection device (6.1).

17. The conveying device (100, 100') according to claim 1, wherein the first detection device (6.1) is configured to detect the depth (T, T2-T4, T2'-T4') of a transport unit (1, 1.1-1.4, 1.1'-1.9') along the direction of conveyance and/or the width of a transport unit (1, 1.1-1.4, 1.1'-1.9') transversely to the direction of conveyance, and the control system (10, 10') is configured to assign to the logical segments (LS, LS1-LS4, LS1'-LS4') extension regions for the depths (T, T2-T4, T2'-T4') and/or widths.

18. The conveying device (100, 100') according to claim 1, wherein the control system (10, 10') is configured to assign to at least one logical segment (LS, LS1-LS4, LS1'-LS4') at least two disjunctive extension regions.

19. The conveying device (100, 100') according to claim 18, wherein the control system (10, 10') is configured to provide at least one disjunctive extension region for the depths of the transport units (1, 1.1-1.4, 1.1'-1.9') along the direction of conveyance, and at least one disjunctive extension region for the widths of the transport units transversely to the direction of conveyance, wherein the control system (10, 10') is configured to assign to the extension regions an identifier for marking the respective extension region for depths or widths.

20. A method for operating a conveying device (100, 100') according to claim 1, the method comprising the steps:
   i) providing transport units (1, 1.1-1.4, 1.1'-1.9') in a conveyor section (3, 3.1, 3.2);
   ii) dividing the indexing conveyor (2, 2') into logical segments (LS, LS1-LS4, LS1'-LS4') by the control system (10, 10');
   iii) assigning at least one extension region to respectively a logical segment (LS, LS1-LS4, LS1'-LS4') by the control system (10, 10');
   iv) detecting the extension (T, T2-T4, T2'-T4') of the transport units (1, 1.1-1.4, 1.1'-1.9') by the first detection device;
   v) transmitting the detected extension (T, T2-T4, T2'-T4') to the control system (10, 10') or the diverter (4);
   vi) comparing the detected extension (T, T2-T4, T2'-T4') of a transport unit (1, 1.1-1.4, 1.1'-1.9') at the clock-integration point (E) with the at least one extension region of a logical segment (LS, LS1-LS4, LS1'-LS4') at the clock-integration point (E); and
   vii) synchronizing the transport unit (1, 1.1-1.4, 1.1'-1.9') from the conveyor section (3, 3.1, 3.2) into the indexing conveyor (2, 2') by the diverter (4) when the detected extension (T, T2-T4, T2'-T4') lies in the at least one extension region.

21. The method according to claim 20, wherein the control system (10, 10') respectively assigns to the at least one extension region a carrier value of a number of carriers (21, 21.1, 21a-b) between two successive transport units (1, 1.1-1.4, 1.1'-1.9') in the respective logical segment (LS, LS1-LS4, LS1'-LS4'), and the diverter (4) clock-integrates the transport units (1, 1.1-1.4, 1.1'-1.9') respectively in such a way into the indexing conveyor (2, 2') that the number of carriers (21, 21.1, 21a-b) between two successive transport units (1, 1.1-1.4, 1.1'-1.9') in the logical segment (LS, LS1-LS4, LS1'-LS4') corresponds to the assigned carrier value of the extension region.

\* \* \* \* \*